Figure 1:
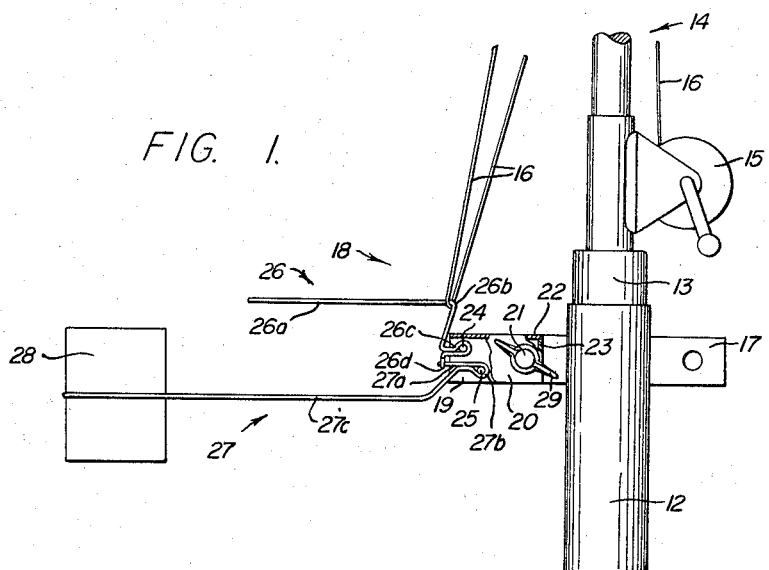

March 5, 1968   D. R. DOBSON   3,371,443
FISHERMAN'S SIGNALING DEVICE
Filed Oct. 23, 1965   2 Sheets-Sheet 1

INVENTOR.
DON R. DOBSON
BY MALLINCKRODT AND MALLINCKRODT
ATTORNEYS

March 5, 1968     D. R. DOBSON     3,371,443
FISHERMAN'S SIGNALING DEVICE
Filed Oct. 23, 1965     2 Sheets-Sheet 2
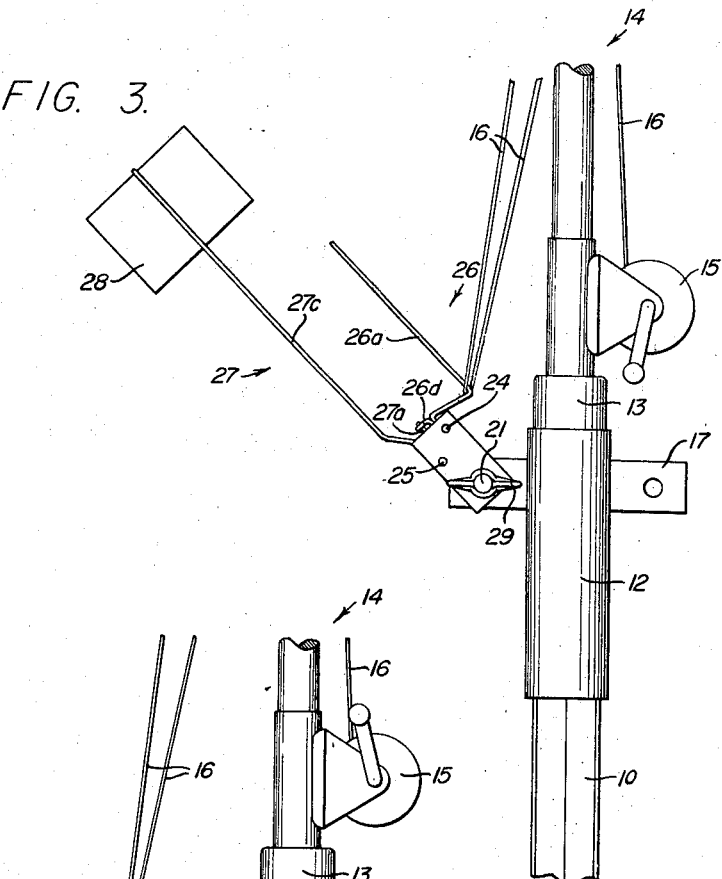
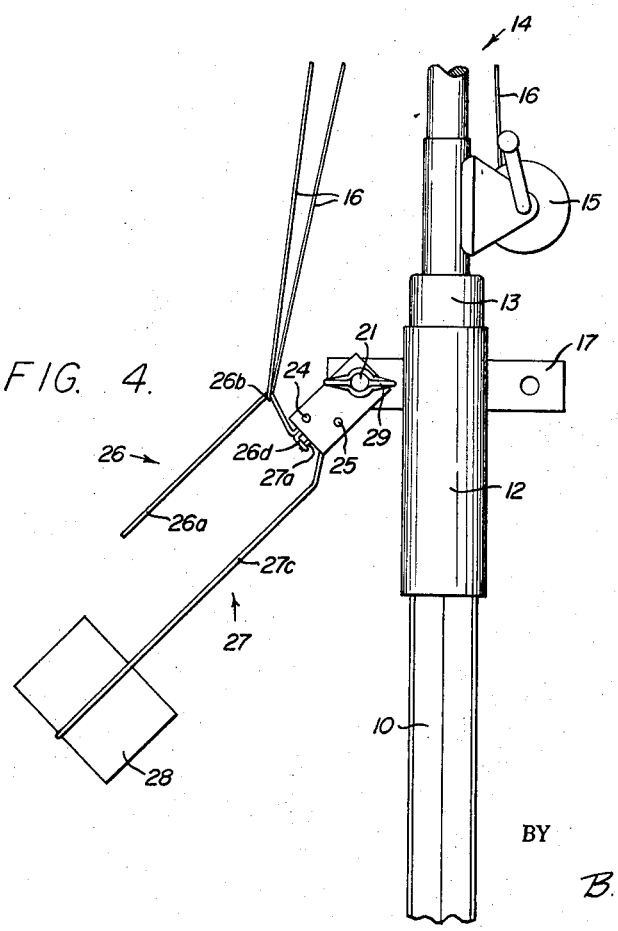
INVENTOR.
DON R. DOBSON
BY MALLINCKRODT AND MALLINCKRODT
ATTORNEYS

United States Patent Office 3,371,443
Patented Mar. 5, 1968

3,371,443
FISHERMAN'S SIGNALING DEVICE
Don R. Dobson, Holden, Utah 84636
Filed Oct. 23, 1965, Ser. No. 503,160
4 Claims. (Cl. 43—17)

This invention relates to devices used by a fisherman to signal when his hook has been taken by a fish.

As the leisure time of people has increased, fishing, as a sport, has become more popular. However, many fishermen do not like to constantly hold their pole, but instead, would rather seecure it in place while they engage in other activities, checking the pole only occasionally to see if a fish, attracted by the bait used, has taken the hook.

It is an object of the present invention to provide an inexpensive holder for poles that can be easily set in the bank of a river or lake and that includes a signaling device that is tripped by the sharp pull of a fishing line.

In accomplishing this object, I employ as principal features of the invention a stake that carries a tubular pole receiver, a flag, the position of which indicates whether or not the hook has been struck, and latch means for holding the flag in a set position until the hook is struck, the latch means being adjustable to regulate the amount of pull that must be applied to the line to release the flag.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

Figure 2:
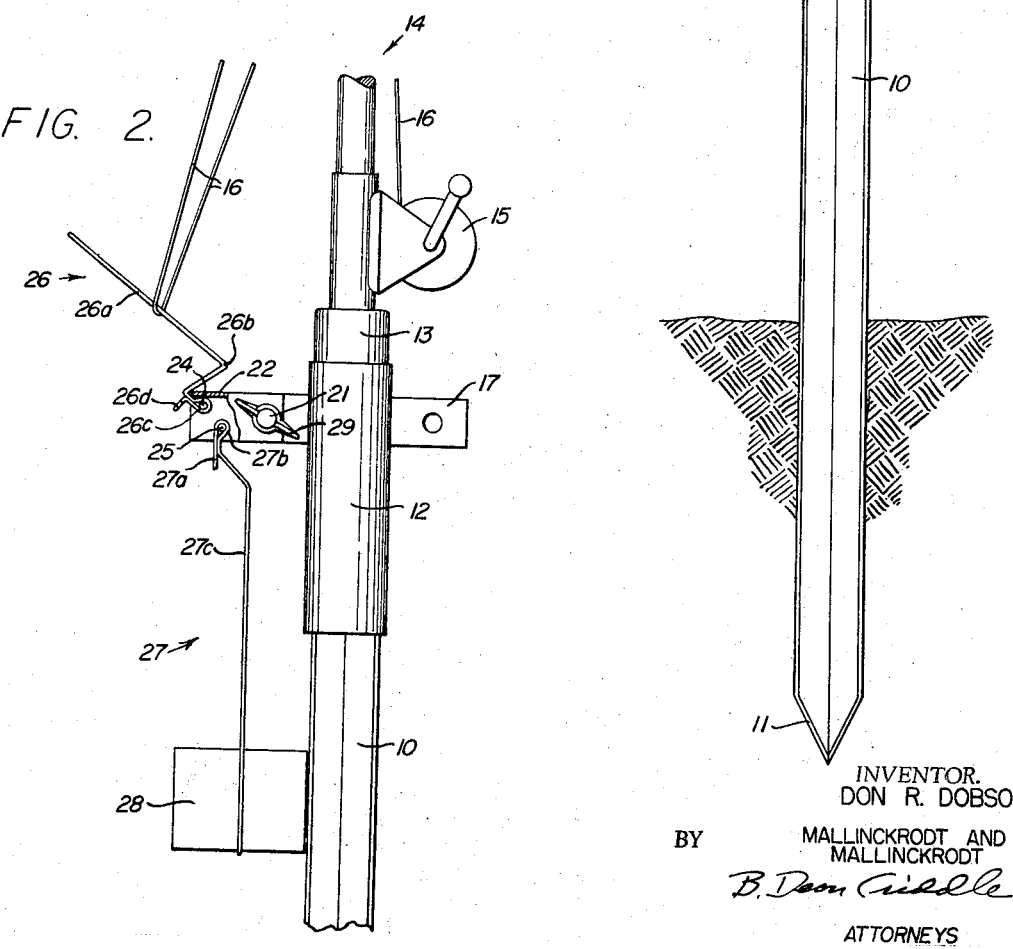

In the drawings:

FIG. 1 is a side elevation of the invention with the flag held in position by the latch means;

FIG. 2, a view like FIG. 1, but showing the flag in its released position;

FIG. 3, a view like FIG. 1, but with the latch means adjusted to require a greater pull on the line before the flag will be released; and FIG. 4, another view like FIG. 1, but with the latch means adjusted to require less pull on the line before the flag will be released.

Referring now to the drawings:

In the illustrated preferred embodiment the fisherman's signaling device includes a stake 10, preferably made of steel or other strong rigid material and also preferably sharpened to have a point 11 to facilitate its insertion into a river or lake bank.

At its upper end stake 10 carries a tubular section 12, adapted to receive a handle 13 of a fishing pole, shown generally at 14, and including a reel 15 from which the usual line 16 is payed out.

A cross-member 17 is also fixed to stake 10 to provide a support for a latching assembly, shown geneerally at 10.

The latching assembly includes a pair of spaced adjustment plates 19 and 20 that are pivotally connected at by a bolt 21 to cross-member 17. Flanges 22 and 23 hold the plates 19 and 20 separated and pins 24 and 25 extending between the plates provide pivot axes for a latch arm 26 and a flag arm 27, respectively.

Latch arm 26 is formed with a straight section 26a, a bend 26b that is adapted to have line 16 passed therearound, a curved section 26c adapted to pass around the pivot pin 24 and an eye 26d, adapted to receive the end of a straight section 27a of flag arm 27.

In addition to straight section 27a the flag arm includes a curved section 27b adapted to pass around the pivot pin 25 and an offset straight section 27c to which a flag 28 is attached.

Bolt 21 passes through both adjustment plates 19 and 20 and has a wing nut 29 threaded thereon.

A fisherman, in using the signaling device, will position stake 10 in the ground, and will then place the handle of a fishing pole from which the line has been payed out in tubular section 12. The position of adjustment plates 19 and 20 is set as desired and wing-nut 21 is tightened to hold them tightly in position against cross-member 17. Flag arm 27 is then raised, and latch arm 26 is allowed to drop such that straight section 27a extends into eye 26d. The weight of the flag arm will counterbalance the force created by any normal drag on the line tending to raise latch arm 26, or the weight of the flag arm will pivot the latch arm until eye 26d abuts the ends of adjustment plates 19 and 20. In either event the flag is held in its raised position.

Enough line is drawn in through the guides (not shown) on the fishing pole to allow it to be passed beneath the latch arm 26 and to be positioned in bend 26b. If a fish takes the hook, not shown, on the end of line 16, an added pull, sufficient to overcome the frictional engagement of eye 26c with straight member 27a, is applied to the line and latch arm 26 is rotated clockwise around its pivot pin 24. This moves the eye away from straight section 27a and allows the flag arm to drop, thereby signaling the fisherman that a fish has taken the hook.

Changing the position of the adjustment plates 19 and 20 changes the amount of pull required on the line before the flag arm will drop. This is because the effective moment arm length of the latch arm, i.e. the normal distance from pivot pin 24 to the force tending to rotate the arm, increases as the latch arm is lowered and decreases as the latch arm is raised. Thus, with the line hooked around bend 26b, a greater pull is required to separate the latch and flag arms when the effective moment arm is short and the adjustment plates are angled upwardly, as shown in FIG. 3, and less pull is required when the effective moment arm is long and the adjustment plates are angled down, as shown in FIG. 4.

The present fisherman's signaling device provides an anchoring device that firmly holds a fishing pole, and it should be apparent that stake 10 can be easily fixed to the hull of a boat or to a tree stump, etc., as well as be inserted into a river or lake bank, and an inexpensive signaling device can easily be adjusted to be responsive to any desired pulling force on a fisherman's line that is within a wide range.

Whereas there is here illustrated and specifically described a certain preferred construction of apparatus which is presently regarded as the best mode of carrying out the invention, it should be understood that various changes can be made and other constructions adopted without departing from the inventive subject matter particularly pointed out and claimed herebelow.

I claim:

1. A fisherman's signaling device comprising:
   a stake;
   means adapted to receive the handle of a fishing pole carried by the stake;
   a flag arm pivotally carried by the stake;
   a latch arm pivotally carried by the stake, said latch arm including a bend adapted to have a fishing line passed thereunder and being adapted to hold the flag arm in a set position when the latch arm is in a lowered position and to release the flag arm to drop when it is moved to a raised position; and
   means for changing the effective moment arm of the latch arm thereby changing the amount of pull required to separate the latch arm from the flag arm.

2. A fisherman's signaling device according to claim 1, wherein:
the latch arm includes an eye; and
the flag arm includes a straight section having one end adapted to extend into said eye.

3. A fisherman's signaling device according to claim 2, wherein:
the means for changing the effective moment arm of the latch arm includes at least one adjustment plate pivotally connected to the stake;
means for releasably clamping the adjustment plate to the stake;
pivot means on the latch plate for the latch arm; and
pivot means on the latch plate for the flag arm.

4. A fisherman's signaling device according to claim 3, wherein:
a cross-member fixed to the stake interconnects the stake and at least one adjustment plate.

References Cited

UNITED STATES PATENTS

| 2,541,307 | 2/1951 | Teel | 43—17 |
| 2,589,610 | 3/1952 | Fowler | 43—17 |
| 2,654,338 | 10/1953 | Deal | 43—17 X |

SAMUEL KOREN, Primary Examiner.

D. J. LEACH, Assistant Examiner.